Figure 5:
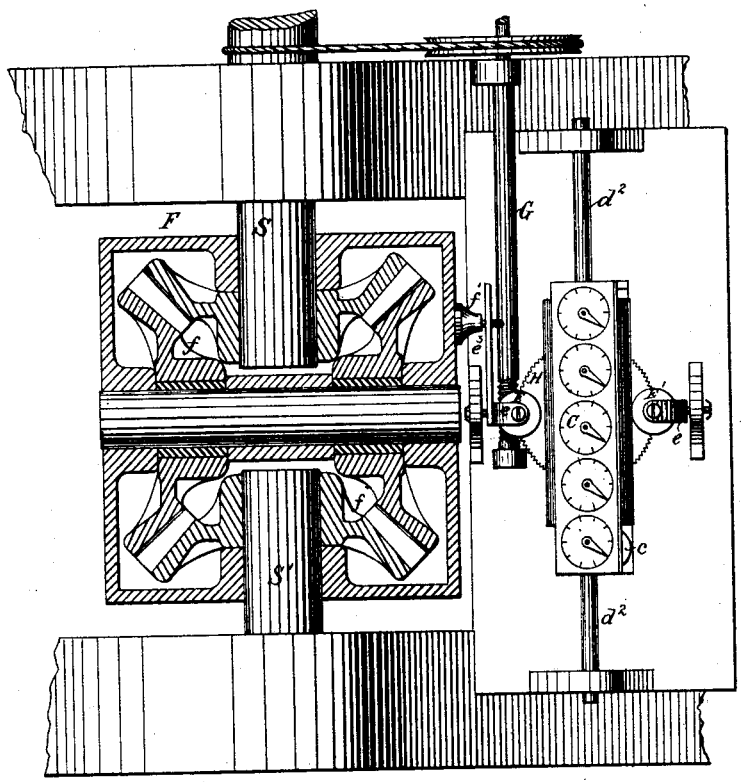

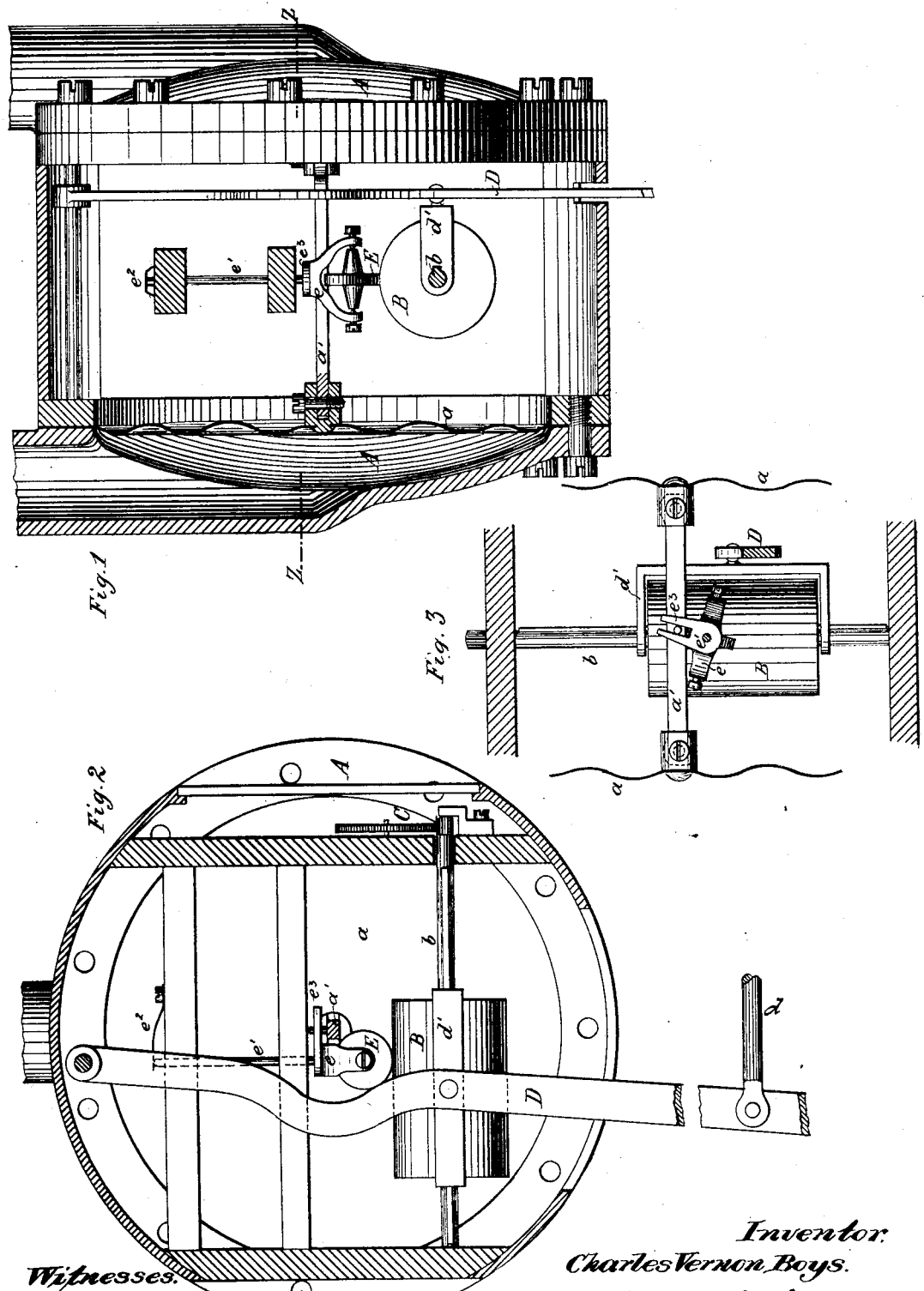

(No Model.) 4 Sheets—Sheet 2.

C. V. BOYS.
INTEGRATING APPARATUS.

No. 258,360. Patented May 23, 1882.

Witnesses.
J. A. Rutherford
Robert Pratt.

Inventor.
Charles Vernon Boys.
By James L. Norris,
Atty

N. PETERS, Photo-Lithographer, Washington, D. C.

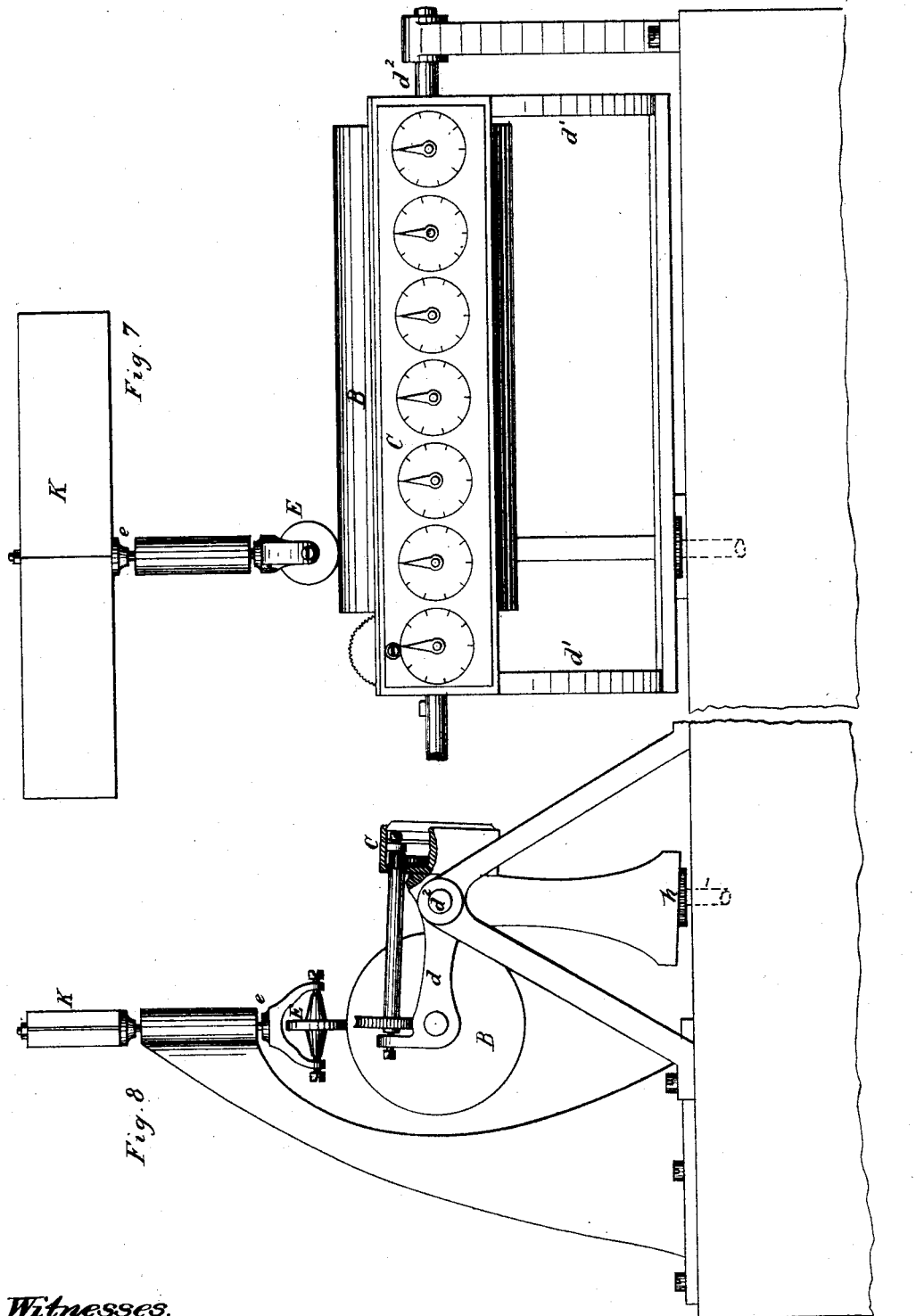

(No Model.) 4 Sheets—Sheet 4.

C. V. BOYS.
INTEGRATING APPARATUS.

No. 258,360. Patented May 23, 1882.

Witnesses.
J. A. Rutherford
Robert Burnett

Inventor.
Charles Vernon Boys.
By James L. Norris.
Atty.

N. PETERS, Photo-Lithographer, Washington, D. C.

UNITED STATES PATENT OFFICE.

CHARLES V. BOYS, OF WING, NEAR OAKHAM, COUNTY OF RUTLAND, ENGLAND.

INTEGRATING APPARATUS.

SPECIFICATION forming part of Letters Patent No. 258,360, dated May 23, 1882.

Application filed December 8, 1881. (No model.) Patented in England June 3, 1881, No. 2,449, and in France November 11, 1881, No. 145,772.

*To all whom it may concern:*

Be it known that I, CHARLES VERNON BOYS, a citizen of England, residing at Wing, near Oakham, in the county of Rutland, England, have invented a new or Improved Integrating Apparatus, (for which I have obtained a patent in Great Britain, No. 2,449, bearing date June 3, 1881,) of which the following is a specification.

In measuring mechanical and electrical force it is usually necessary to integrate or sum up a number of products the factors of which undergo variation. For example, in ascertaining the power developed in a steam-cylinder, where the pressure varies while the piston is performing its stroke, the product of the two factors, pressure by space moved over, is usually represented by the area of an indicator-diagram, which area has to be measured.

My invention relates to apparatus which indicates and registers by a counter, such as that employed for gas and other meters, the integral or summation of a series of varying products, such as those produced by multiplying the varying pressure by the space passed over.

I will best explain the construction and operation of this apparatus by showing how it can be applied in various cases to measurement of mechanical or electrical power; but I may in the first place briefly describe the general character of the apparatus, as follows: I mount a cylinder on an axis along which it can slide longitudinally, and at the side of the cylinder I mount a disk with its periphery in contact with the surface of the cylinder, this disk having its axis mounted in a swivel-frame, so that the plane of the disk can be inclined at various angles to the axis of the cylinder. When the disk and the axis of the cylinder are in the same plane the cylinder, when it is slid along its axis, has no tendency to revolve; but when the plane of the disk is inclined to the axis of the cylinder the cylinder, when it is slid along its axis in contact with the inclined disk, is caused to turn more or less according as the inclination of the disk is greater or less. The extent of revolution thus given to the cylinder is proportional to the product of the distance which the cylinder travels longitudinally by the tangent of the angle which the plane of the disk makes with the axis of the cylinder. If, while the cylinder travels, the inclination of the disk varies, the amount of revolution given to the cylinder is proportional to the integral of the varying product. The axis of the cylinder being connected to a counter by suitable gearing, the indication given by this counter of the number of revolutions or parts of a revolution of the cylinder is a measure of the integral required. As for the purpose of lengthened observation it would be impracticable or inconvenient to employ a very long cylinder always traveling in one direction, I cause a comparatively short cylinder to reciprocate longitudinally, and apply the disk to it in such a manner as to cause rotation of the cylinder always in the same direction. This may be done in several ways. One way is to take the disk out of contact with the cylinder during its back stroke, thus obtaining intermitted movements of rotation. Another way is to incline the disk in the opposite direction during the back stroke of the cylinder; and a third way is to employ two disks equally inclined on opposite sides of the cylinder, the one being in contact during the forward stroke and the other during the backward stroke of the cylinder. These arrangements will be better understood from the description which I will now give of several modes of applying my integrating apparatus for the measurement of power.

In applying this instrument to measure the power given out by a reciprocating prime mover—such as a steam-engine or other engine worked by fluid-pressure—I connect the cylinder to a moving part of the engine, so that it is caused to move to and fro longitudinally in time with and in proportion to the movements of the working-piston of the engine. To the cylinder of the engine I connect by a small pipe a small cylinder fitted with a spring-piston, as in an ordinary indicator, or its equivalent, a vessel covered by a flexible diaphragm, as in an aneroid-barometer, and I connect the rod of the indicator-piston, or a stem projecting from the diaphragm, by a pin working in a radially-slotted hole, to an arm fixed on the swiveling axis of the integrating-disk, so that, according as the pressure varies in the engine-cylinder, the plane of the disk is moved to various degrees of obliquity to the axis of the integrating-cylinder. As this cylinder is caused to reciprocate in correspondence with the piston of the engine, it is at the same time, by its frictional contact with the disk, caused to turn more or less round. The extent of the revolution thus given to the integrating-cylinder is proportional to the product of the pressure on the engine-piston multiplied by the space traversed by it, and is therefore a measure of the work done by the engine-piston. As the pressure which causes the piston to perform this work is the excess of the pressure on one of its sides over that on its other side, I prefer to make the indicator-cylinder double-acting, its ends communicating respectively with the ends of the working-cylinder; or when a flexible diaphragm is substituted for the indicator-piston I prefer to employ two of these, subject respectively to the pressures at both ends of the working-cylinder. Thus the swiveling of the integrating-disk is that which is due to the excess of pressure acting on the one side or the other of the working-piston.

Figure 1 of the accompanying drawings is a front view, partly in section. Fig. 2 is a transverse section; and Fig. 3 is a sectional plan on Z Z of an integrating apparatus of the kind above described, applicable to a double-acting steam or other fluid-pressure engine.

A A are two vessels covered by flexible diaphragms $a$ $a$, the centers of which are connected by an intervening stem, $a'$. The vessels A A communicate respectively by pipes with the two ends of the working-cylinder of the engine, and they may contain a mixture of glycerine with water or other suitable liquid, which, while it is subject to the varying pressures of the fluid acting in the cylinder, saves the diaphragms from being affected by its heat. B is the integrating-cylinder, fitted by a feather on an axis, $b$, so that, while the cylinder can slide along it, it must revolve with the cylinder. It gears at C with the wheels of a counter or register of any convenient form.

D is a lever, which can at any suitable part of its length be connected by a rod, $d$, to the piston-rod, beam, or other part of the engine having movements corresponding with those of the piston. To the lever D is connected by a ball-and-socket joint a yoke, $d'$, which embraces the two ends of the integrating-cylinder B, and which, as the lever D reciprocates, causes the cylinder B to travel to and fro along its axis $b$.

On the upper surface of B bears the disk E, which is mounted in a swivel-frame, $e$, having a vertical axis, $e'$, pressed down by a spring, $e^2$. On the axis $e'$ is fixed an arm, $e^3$, having a radial slot, in which works a pin projecting from the stem $a'$, that connects the two diaphragms $a$ $a$, so that, according as the diaphragms move inward or outward in obedience to the excess of pressure on the one or other of them, the swivel-frame $e$ is caused to turn in the one or the other direction, inclining the disk E more or less to the axis of the cylinder B. As the alternation of the pressure on the two diaphragms $a$ $a$ corresponds with the alternation of the longitudinal motion of the cylinder B, the obliquity of the disk E has the effect of turning the cylinder B always in the same direction, and the extent of this turning, as indicated and recorded by the counter at C, is a measure of the work done, as above explained.

In applying the integrating apparatus to measure the power transmitted through a revolving shaft I connect the integrating-cylinder to the shaft, so that it is caused by a mangle motion or equivalent mechanism to reciprocate longitudinally at a speed bearing a known proportion to that of the shaft. I connect the swivel-axis of the integrating-disk to a differential coupling of the shaft, having a spring to take the strain passing through the shaft, the disk being thus more or less inclined to the axis of the integrating-cylinder, according as the strain is greater or less. As the integrating-cylinder reciprocates, the disk, if it bore against it during its back stroke, would undo the record made during its forward stroke. I therefore employ two disks, the one made to bear against the cylinder during its forward stroke and the other during its back stroke, and I thus obtain a revolving movement of the cylinder always in one direction.

Figure 4:
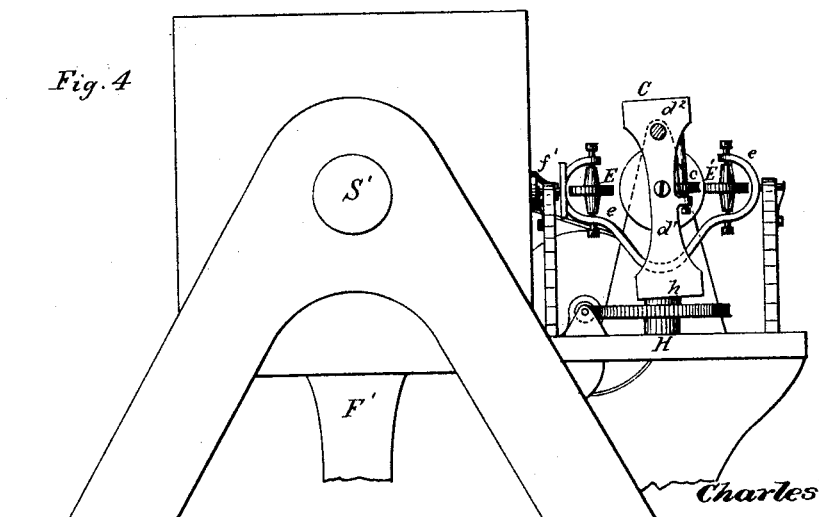

Fig. 4 is an end view, and Fig. 5 a plan showing the integrating apparatus applied in this manner to measure the work transmitted from a revolving shaft, S, to another shaft, S', connected to it by a differential coupling of known kind, consisting of a box, F, in which are mounted on a transverse axis bevel-pinions $ff$, gearing with bevel-pinions on the two shafts S S'.

The box F is prevented from revolving by a suitable spring applied to its circumference; but it turns partly round in the one direction or the other, according as the strain transmitted through the bevel-gear overpowers or falls short of the strain of the spring. From the side of the box F a pin, $f'$, projects into a radial slot in an arm, $e^3$, of a swivel-frame, $e$, in which are mounted the two disks E E', one on each side of the integrating-cylinder B. Thus as the box F turns more or less round its axis the disks E E' are inclined more or less obliquely to the axis of the cylinder B. This cylinder B is mounted in a yoke-frame, $d'$, which can swing on and travel along a rod, $d^2$, and which carries on its upper part a counter, C, worked by worm-gear $c$ from the cylinder B.

Figure 6:
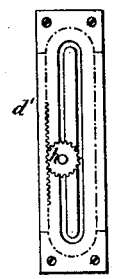

A counter-shaft, G, driven by a band or otherwise from the shaft S, works by worm-gear a wheel, H, on which is a pinion, $h$. This pinion forms part of a mangle-motion, which causes the frame d' to travel to and fro, as will be understood on reference to Fig. 6, which is a plan showing the under face of the frame d', and at each alternation of movement it causes the frame to swing from one side to the other. Thus while the cylinder B travels in the one direction it bears against one of the disks, E or E', and while it travels in the opposite direction it bears against the other of the disks. Thus, so long as both disks remain inclined in one way, the cylinder B in both its forward and its backward strokes is caused to turn more or less round in one direction, and the number or extent of its revolutions registered by the counter C indicates, as above explained, the work transmitted from the shaft S to the shaft S'.

Although I have in this application of the integrating apparatus shown a particular known form of differential coupling for the shafts S S', it is to be understood that other forms of differential couplings might be employed, such as are used for various governors, these being so arranged that a variation of strain transmitted through a shaft occasions a movement of some part of the coupling, which movement can be transmitted by suitable connections to the common swiveling axis of the integrating-disks E E'. In like manner the work conveyed by a continuously-traveling strap or band may be registered, the integrating-cylinder B being caused to reciprocate at a rate proportioned to the speed of the band, and the inclination of the disks E E' to the axis of B being varied according to the driving strain of the band, as determined by a suitable dynamometer of known kind applied to the band.

It is not essential that two disks, E E', should be employed unless it be required to get a continuous record of work done. In most cases it suffices to get a record at frequent intervals, and therefore one of the two disks E E' may be dispensed with, in which case every alternate stroke of the integrating-cylinder will be an idle stroke. I proceed to describe an arrangement of this kind in which the integrating apparatus is applied to measure the electricity passing through a conductor in a given time, referring to Fig. 7, which is a side view, and Fig. 8, which is an end view. In this case the integrating-cylinder B is mounted in a bell-cranked yoke-frame, d, caused to swing on and travel along the rod $d^2$ by the mangle-motion pinion h, which is driven by any suitable clock-work. The disk E is mounted in a swivel-frame whose axis e carries a galvanometer-needle, K, subject to the greater or less deflection caused by more or less electricity passing through a coil surrounding it, according to any known arrangement, that coil being part of the conductor of the electricity which is to be measured. As the cylinder B makes its stroke in the one direction it is withdrawn from contact with the disk E, and consequently its stroke is idle; but when it makes its stroke in the opposite direction it bears against the disk E, and according as the disk is more or less inclined to the axis of the cylinder, as determined by the deflection of the needle K, the cylinder will be caused to turn more or less round its axis. The number or extent of revolution thus imparted at every alternate stroke to the cylinder B is recorded by a counter, C, which is mounted on the swing-frame d, and is worked by worm or other suitable gear from the cylinder B.

Figure 9:
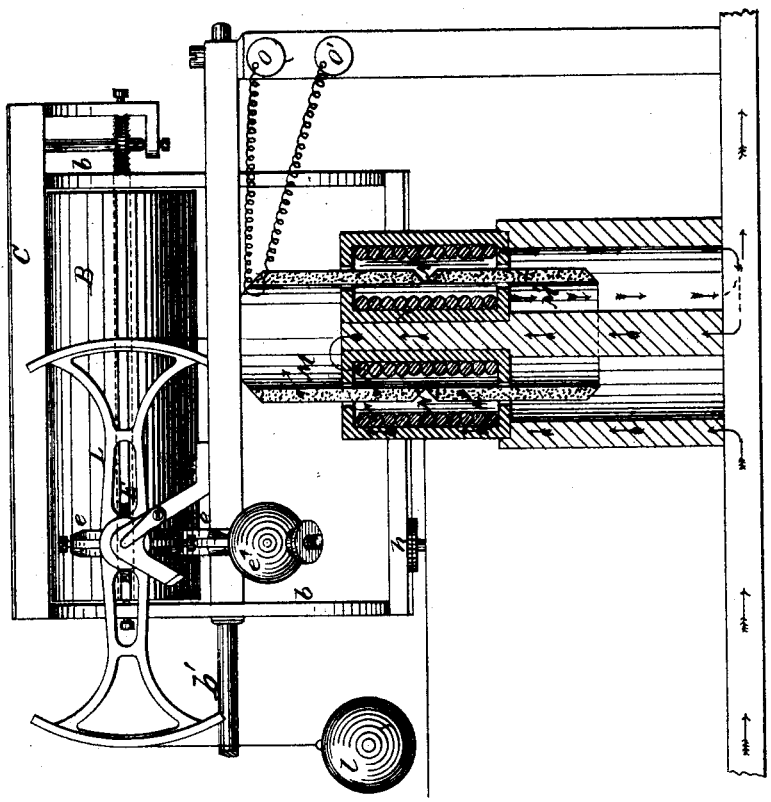
Figure 10:
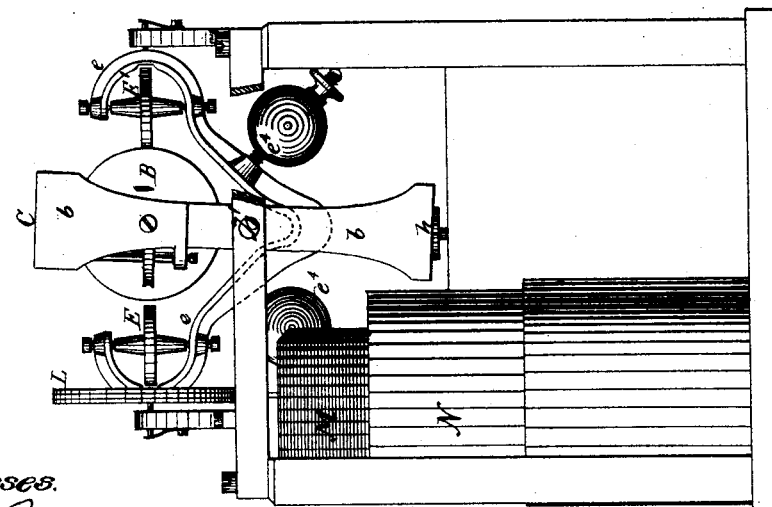

When it is desired to measure the work done by an electrical current between two points of a conductor—that is to say, the product of the main current by the difference of the potentials at the two points—I apply the integrating apparatus as shown at Figs. 9 and 10, Fig. 9 being a side view, partly in section, and Fig. 10 an end view. The integrating-cylinder B is mounted in the yoke-frame b, which is caused by a mangle-motion to travel to and fro along the rod b', and also to swing so as to bring the cylinder into contact with each of the disks E E' alternately as it makes its to and fro strokes. The pinion h of the mangle-motion is driven by clock-work. The swivel-frame e, in which the disks E E' are mounted, is in this case fixed on the axis of a beam, L, one end of which is loaded by a weight, l, and from the other end is suspended the movable core M M' of a stationary solenoid, N N'. The solenoid consists of an outer coil, N, and an inner coil, N', both of large insulated wire wound in the same direction and forming part of the electrical conductor. The core consists of an upper part, M, and a lower part, M', both consisting of fine insulated wire wound in opposite directions, this wire forming a by-pass circuit of high resistance, connected to the two points O O' of the main circuit, between which points the electrical work expended is to be measured.

It will be seen that according as the upper core, M, is more or less drawn down into the solenoid, while the lower core, M', is at the same time more or less repelled downward, so the disks E E' are more or less inclined to the axis of the integrating-cylinder, causing it, as it reciprocates, to turn more or less round. The number or extent of the revolutions of the cylinder B registered in a given time on the counter C will then give a measure of the work performed by the electricity in its circuit between the points O O'.

In some cases, for particular purposes of integration, instead of the integrating-cylinder, a cone, sphere, or other solid of revolution may be employed, the swivel-frame of the disk having suitable movements imparted to it; also, instead of employing a disk having its plane more or less inclined to the axis of the cylinder, a sphere may be employed having its rotating axis more or less inclined to that of the cylinder, and its circle of contact with the cylinder more or less distant from its equatorial plane.

Instead of or in addition to a counter for registering the number or extent of the revolutions of the integrating-cylinder, a receptive surface—such as paper—may be arranged to have a diagram of results traced upon it. For example, the integrating-cylinder might be clothed with a receptive surface; or a band of paper might be made to travel with the cylinder, so that a diagram could be drawn thereon by a stationary tracing-point.

It will be observed that as the pulsations of the steam or electricity or the vibrations of the strain are received upon the disk or disks and transmitted to and revolve the cylinder, and simultaneously with which the reciprocations and the rotations of the shaft are also transmitted to and slide the cylinder back and forth, the said movement of the cylinder will be communicated to its shaft operating the counter, and thus register the amount of work done—i. e., in the case of a steam-engine, foot pounds—from the time when the apparatus is first put in motion to any time—whether an hour, day, or week—when it is desired to ascertain the result.

Having thus described the nature of my invention, and the best way I know of carrying it into practical use, I claim—

1. An integrating apparatus consisting of a cylinder made to slide along its axis while its surface is in contact with a disk more or less inclined to the axis, and of a counter which registers the amount of revolution thus imparted to the cylinder, substantially as and for the purpose herein set forth.

2. In combination with the integrating-cylinder B, the disk E, mounted in frame e, and actuated alternately by the flexible diaphragms a a, subject to the pressure in the working-cylinder of the engine, substantially as and for the purposes set forth.

In testimony whereof I have signed my name to this specification, in the presence of two subscribing witnesses, this 16th day of November, A. D. 1881.

C. V. BOYS.

Witnesses:
OLIVER IMRAY,
JOHN DEAN.